Dec. 7, 1926.  1,609,521
E. W. LEATHERMAN
COMBINED AIR SCOOP AND DAMPER VALVE
Filed Oct. 29, 1925   2 Sheets-Sheet 1
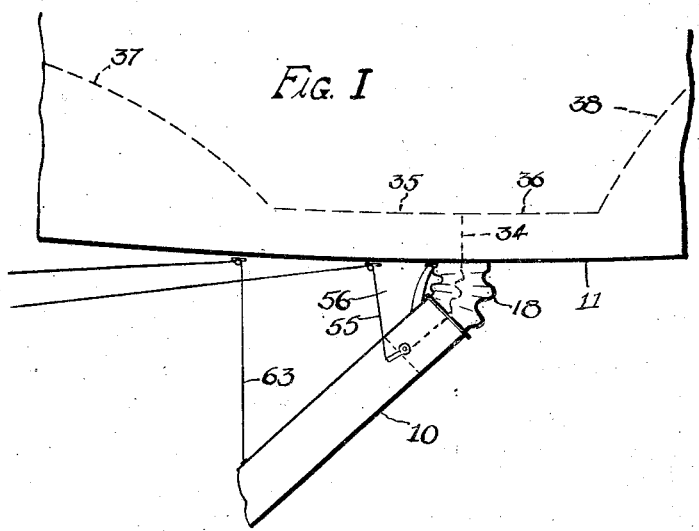
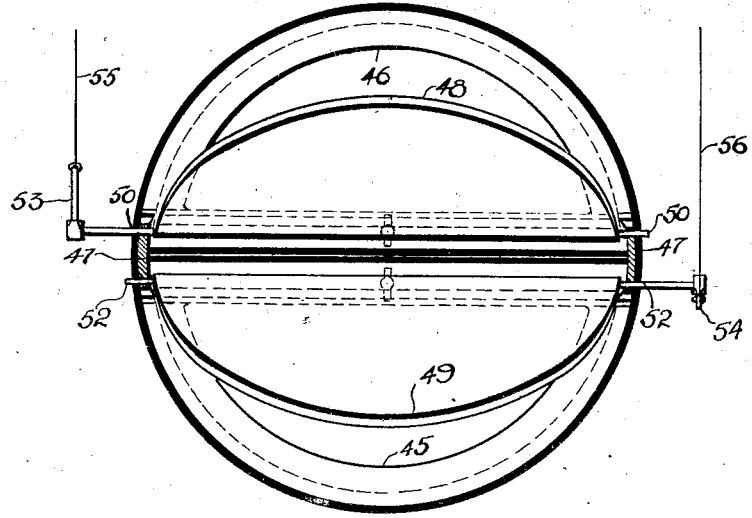
INVENTOR
Earl W. Leatherman
BY
ATTORNEY Dec. 7, 1926.

E. W. LEATHERMAN 1,609,521

COMBINED AIR SCOOP AND DAMPER VALVE

Filed Oct. 29, 1925    2 Sheets-Sheet 2

Inventor
Earl W. Leatherman.

By

Attorney

Patented Dec. 7, 1926.

1,609,521

UNITED STATES PATENT OFFICE.

EARL W. LEATHERMAN, OF AKRON, OHIO, ASSIGNOR TO THE GOODYEAR TIRE & RUBBER COMPANY, OF AKRON, OHIO, A CORPORATION OF OHIO.

COMBINED AIR SCOOP AND DAMPER VALVE.

Application filed October 29, 1925. Serial No. 65,572.

My invention relates to airships and it has particular relation to devices employed in inflating airship ballonets during flight and known as air scoops.

The object of my invention is to provide an apparatus of the character indicated which is so constructed that it serves as an air scoop and has incorporated therein a valve for controlling the flow of air to the several ballonets, thereby effecting a considerable saving in weight and material, and simplifying the operation incident to inflating airship ballonets.

In the construction of airships which depend upon buoyant gases to provide lifting power, one or more ballonets are frequently positioned in the lower portion of the airship envelope and are inflated with air, which is usually supplied through an air scoop. In the event that several ballonets are employed, they are supplied with a number of air conduits or inlet passageways which communicate with a centrally located air scoop or with a plurality of air scoops secured to the envelope. In order to control the flow of air into the ballonets, which controls the amount and pressure of air therein, it has heretofore been customary to provide damper valves incorporated within the airship envelopes. A special supporting structure for the dampers was necessary in order that they could be properly installed without danger of injuring the envelope.

By employing the invention disclosed herein, the disadvantages which follow from the disposition of the damper valves internally of the envelope are obviated. My invention is embodied in a compact structure including a damper valve and an air scoop disposed outside the envelope, with the result that the structure is conveniently accessible for inspection and repair and is adapted to be manufactured and assembled independently of the airship. In the event that it becomes necessary to repair the damper valve, the structure may be disconnected from the airship, thereby eliminating all possibility of injury to the envelope or to the ballonets.

The operating elements of the damper valve are so arranged within the air scoop that the latter functions normally and it does not require material alteration in its structure to accommodate the damper valve. However, I have provided additional improvements in the air scoop in the form of connections employed for securing it to the airship envelope.

For a better understanding of my invention reference may now be had to the accompanying drawings forming a part of this specification, of which;

Fig. 1 is a fragmentary elevational view of an airship illustrating one embodiment of my invention;

Fig. 3 is a transverse cross-sectional view illustrating portions of the internal structure of an apparatus constructed according to my invention, the view being taken substantially along the line III—III of Fig. 2.

Figure 2:
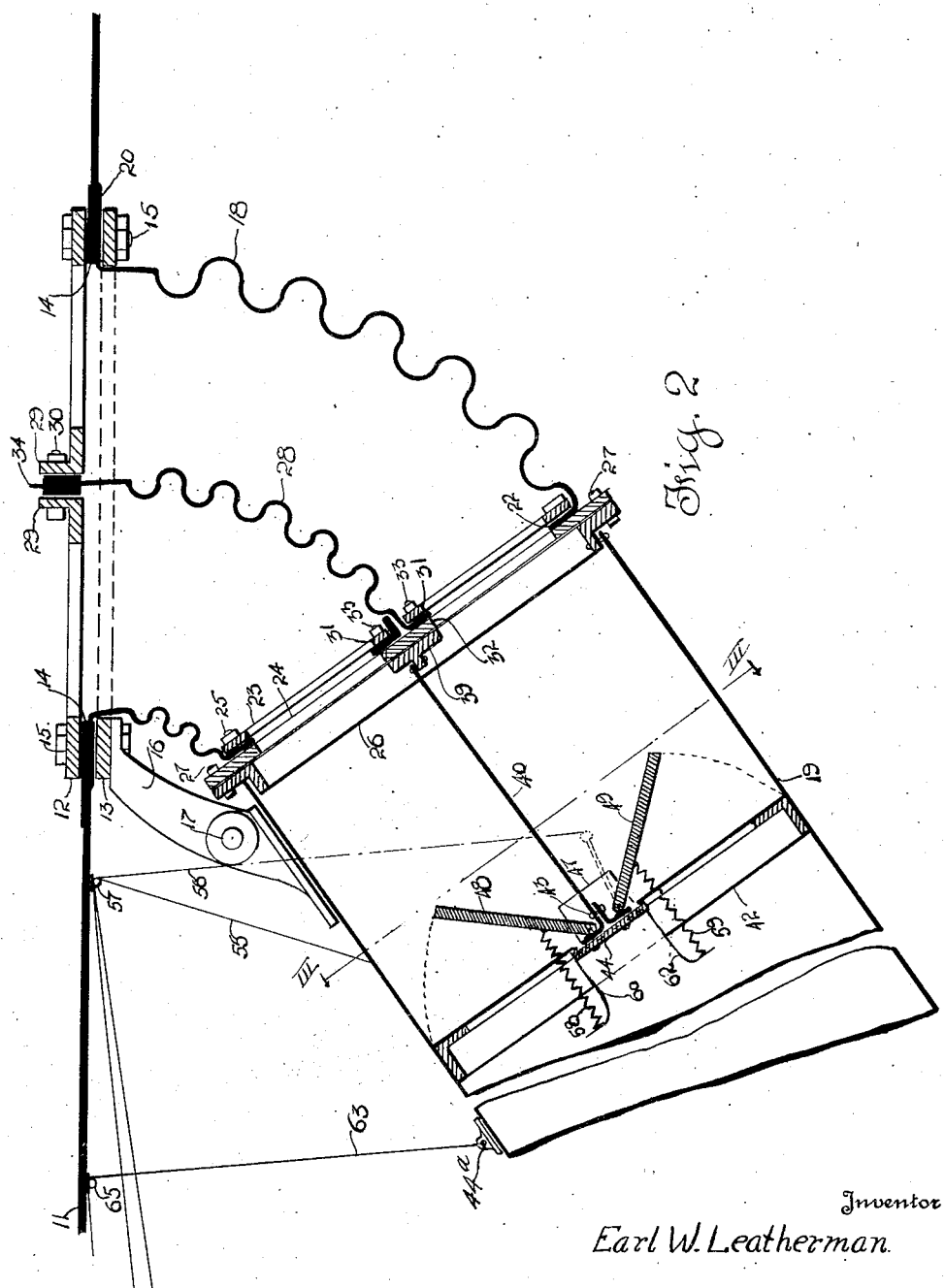
Fig. 2 is a longitudinal cross-sectional view of my combined air scoop and damper valve showing the internal structure thereof.

In practising my invention I provide an air scoop structure 10 which is secured to the lower portion of an airship envelope 11. In order to insure adequate supporting means for the air scoop, I provide two rigid rings 12 and 13 which have clamped between them a reinforced edge portion 14 of an opening in the bottom portion of the envelope. Suitable securing bolts 15 maintain the rings in clamping relationship. The air scoop 10 is suspended from the ring 13 by a hinge member 16 secured to one of the clamping bolts 15 and it is provided with an articulated joint 17 about which the scoop is adapted to pivot.

It will be observed that the air scoop structure 10 comprises a flexible elbow 18 and a lower relatively rigid portion 19. One end of the elbow 18 is formed with laterally extending edges 20 which are clamped between the rings 12 and 13 against the reinforced edge portion 14 of the airship envelope. The other end of the elbow is likewise formed with edge portions 22 which are clamped between two rings 23 and 24 secured together by means of bolts 25. A flanged ring 26 is provided adjacent the upper extremity of the rigid portion 19 and serves as an anchoring support for the rings 23 and 24, which are secured thereto by means of bolts 27.

As best shown in Fig. 2, a flexible partition 28 divides the elbow 18 into two air passages. The upper end of the partition is secured between two members 29, which extend diametrically across the ring 12.

The members 29 are provided with the usual clamping bolts 30. The lower end of the partition 28 is clamped between members 31 and 32 which extend diametrically across the rings 23 and 24 respectively. These members are secured together by means of conventional bolts 33. Adjacent the upper end of the partition 28, a fabric partition 34, which forms substantially a continuation of the first named partition, extends within the envelope of the airship and separates oppositely extending channels or passageways 35 and 36 forming a part of or leading to a plurality of ballonets indicated at 37 and 38 respectively.

The ring 26 is provided with a flanged member 39, extending diametrically thereof, which is disposed parallel to and in contact with the member 32. This flange member 39 serves as a support to which one end of a fabric or other partition 40 is secured. The other end of the partition 40 is disposed diametrically across a reinforcing ring 42 secured within the rigid portion 19. Suitable connecting means indicated at 43 is adapted to properly position the lower edge of the partition 40 across a diametrically disposed support 44 forming a part of the ring 42.

The ring 42 is constructed to form two openings 45 and 46 separated by the support 44. Adjacent the ends of the support 44 and extending from the periphery of the ring 42, I provide bearing lugs 47. The bearing lugs are adapted to support damper valve members 48 and 49, which are formed with oppositely extending bearing projections 50 and 52 resting in the bearing lugs 47. One of the projections 50 and one of the diametrically opposite projections 52 are provided with crank arms 53 and 54, respectively, which are adapted to be connected to control cables 55 and 56. By operating the cables 55 and 56, which are trained about a pulley 57, and communicate with the pilot car (not shown), the damper valve members 48 and 49 may be moved simultaneously or independently to open or close the openings 45 and 46.

In order to insure proper closing of the damper valve members 48 and 49, I provide springs 58 and 59 connected to these members at one end and at the other end to brackets 60 and 62 secured to the cross member 43.

The air scoop is maintained at a proper angle with respect to the envelope 11 by means of a cable 63 connected as indicated at 44ª, and trained over a pulley 65 secured in a suitable manner to the envelope 11. This cable is operated from the pilot car.

By constructing the air scoop according to the foregoing description, it will be apparent that I provide a continuous conduit for directing the flow of air from the air scoop to the forward ballonet 37, the conduit being separated by the partitions 34, 28 and 40, from a second conduit which directs the flow of air to the aft ballonet 38. The degree to which each ballonet is inflated may be controlled independently by operating the damper valves without changing the position of the air scoop. This is done by operating the cables 55 and 56 as above described. When the desired amount of air has been directed to the ballonets the cable 63 is pulled by the operator in the pilot car and the rigid portion 19 of the air scoop raised to a position substantially parallel to and in engagement with the lower surface of the envelope 11, thereby reducing wind resistance. This change of position of the air scoop is facilitated by the flexible elbow 18, which permits adequate relative movement between the rigid portion 19 and the envelope 11.

It will be apparent that the air scoop may be provided with additional partitions and damper valves in the event that the airship is constructed with more than two ballonets. For example, additional partitions similar to those indicated at 28 and 40 may be disposed at right angles thereto.

Although I have illustrated but one form which my invention may assume and have described in detail but a single application, it will be apparent to those skilled in the art that it is not so limited but that various minor modifications and changes may be made therein without departing from the spirit of my invention or from the scope of the appended claims.

What I claim is:

1. An air scoop adapted to be attached to the envelope of an airship comprising a relatively rigid hollow portion, a flexible portion secured to the envelope and to said hollow portion and a partition disposed within the rigid hollow portion forming independent passageways within the air scoop.

2. An air scoop adapted to be attached to the envelope of an airship comprising a rigid hollow portion, a hinged member secured to the envelope and to the hollow portion, and a flexible hollow elbow forming a connection directly between the rigid portion and the envelope.

3. An air scoop for an airship provided with an envelope comprising a rigid portion, a flexible portion extending directly from the envelope and communicating with the rigid portion, a hinged member constituting a connection between the rigid portion and the airship, and partitions dividing the air scoop into a plurality of passageways.

4. An air scoop for an airship provided with an envelope comprising a rigid portion, a flexible portion extending directly from the envelope and connected to the rigid portion, a hinged member constituting a connection between the rigid portion and the airship, partitions dividing the air scoop into a plurality of passageways, and means within the rigid portion for independently controlling the flow of air through each passageway.

5. The combination with an airship envelope having a plurality of passageways adapted to communicate with ballonets, of an air scoop connected to the envelope, comprising a relatively rigid portion, a fabric elbow and pivoted damper within the rigid portion adapted to control the flow of air through the passageways.

6. An air scoop comprising a relatively rigid hollow member formed with a partition therein, a damper on each side of the partition, a hinge member secured to the member, a fabric extension on the relatively rigid member being of substantially the same cross-sectional contour as the relatively rigid member, and a partition cooperating with the first named partition to provide a plurality of continuous passageways from the relatively rigid member through the fabric extension.

7. An air scoop comprising a relatively rigid hollow member formed with a partition therein, a plurality of clamping rings secured at one end thereof for supporting the partition, a hollow fabric extension secured to the rings, a partition in the fabric extension cooperating with the first named partition to form continuous passageways, and means for controlling the flow of air through the passageways.

In witness whereof, I have hereunto signed my name.

EARL W. LEATHERMAN.